United States Patent
Virolainen (10) Patent No.: US 7,420,935 B2
(45) Date of Patent: Sep. 2, 2008

(54) TELECONFERENCING ARRANGEMENT

(75) Inventor: Jussi Virolainen, Espoo (FI)

(73) Assignee: Nokia Corporation, Espoo (FI)

( * ) Notice: Subject to any disclaimer, the term of this patent is extended or adjusted under 35 U.S.C. 154(b) by 1066 days.

(21) Appl. No.: 10/259,819

(22) Filed: Sep. 26, 2002

(65) Prior Publication Data

US 2003/0063574 A1   Apr. 3, 2003

(30) Foreign Application Priority Data

Sep. 28, 2001   (FI) .................................. 20011917

(51) Int. Cl.
*H04L 12/18* (2006.01)

(52) U.S. Cl. .................. 370/263; 370/266; 370/267; 379/202.01

(58) Field of Classification Search ......... 370/259–261, 370/263, 265–271, 352, 353, 354, 355, 356, 370/353–56; 379/158–160, 202.01, 203.01, 379/204.01, 205.01, 207.01

See application file for complete search history.

(56) References Cited

U.S. PATENT DOCUMENTS

| | | | |
|---|---|---|---|
| 5,272,698 A | 12/1993 | Champion | |
| 5,317,567 A | 5/1994 | Champion | |
| 5,383,184 A | 1/1995 | Champion | |
| 5,457,685 A | 10/1995 | Champion | |
| 5,884,039 A * | 3/1999 | Ludwig et al. | 709/227 |
| 5,896,500 A * | 4/1999 | Ludwig et al. | 709/204 |
| 5,991,385 A * | 11/1999 | Dunn et al. | 379/202.01 |
| 6,125,115 A | 9/2000 | Smits | |
| 6,192,395 B1 * | 2/2001 | Lerner et al. | 709/204 |
| 6,233,605 B1 * | 5/2001 | Watson | 709/204 |
| 6,418,214 B1 * | 7/2002 | Smythe et al. | 379/202.01 |
| 6,807,563 B1 * | 10/2004 | Christofferson et al. | 709/204 |
| 6,850,496 B1 * | 2/2005 | Knappe et al. | 370/260 |
| 6,985,571 B2 * | 1/2006 | O'Malley et al. | 379/202.01 |
| 7,006,616 B1 * | 2/2006 | Christofferson et al. | 379/202.01 |
| 7,092,002 B2 * | 8/2006 | Ferren et al. | 348/14.08 |
| 7,266,091 B2 * | 9/2007 | Singh et al. | 370/260 |
| 7,298,834 B1 * | 11/2007 | Homeier et al. | 379/202.01 |

FOREIGN PATENT DOCUMENTS

| | | |
|---|---|---|
| EP | 0 955 789 A2 | 11/1999 |
| EP | 1 113 657 A2 | 7/2001 |
| WO | WO 99/53673 * | 10/1999 |
| WO | WO 01/08136 | 7/2000 |
| WO | WO 00/48379 | 8/2000 |

* cited by examiner

*Primary Examiner*—Wing F. Chan
*Assistant Examiner*—Mark A. Mais
(74) *Attorney, Agent, or Firm*—Hollingsworth & Funk, LLC (57) ABSTRACT

A method and an apparatus for controlling a conference call is a system which comprises a conference bridge for combining several audio signals arriving from terminals and for transmitting the combined signal further to at least one of the terminals using at least one transmitting codec. The conference bridge comprises a spatialization unit for creating a spatial effect. The number of simultaneously active audio components, such as speech signals, is determined from the audio signals of the conference bridge inputs. At least one transmitting codec is selected for use on the basis of the number of simultaneously active audio components and the combined signal is transmitted to at least one terminal using the selected transmitting codec.

26 Claims, 6 Drawing Sheets

TELECONFERENCING ARRANGEMENT

FIELD OF THE INVENTION

The invention relates to teleconferencing systems and particularly to selecting an audio codec for use in teleconferencing.

BACKGROUND OF THE INVENTION

Various audio and video conferencing services have been available for long, particularly in circuit-switched telecommunications networks. Teleconferencing systems can be divided into distributed and centralized systems, of which the latter ones have turned out to be more advantageous in providing teleconferencing services, considering the service providers and the implementation of terminals.

Figure 1:
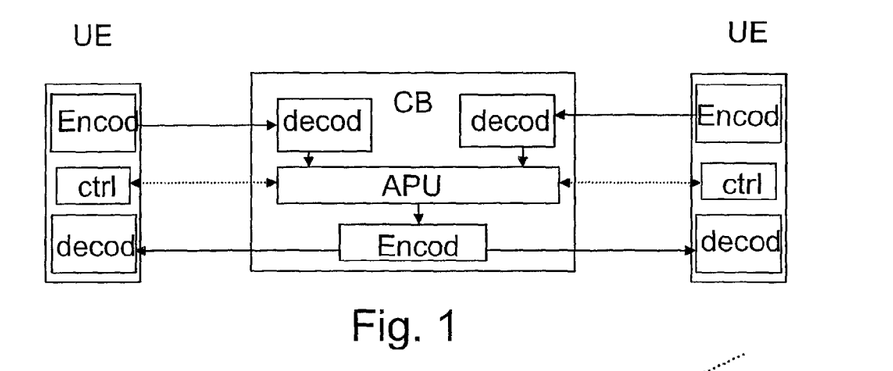
FIG. 1 shows a prior art basic design for implementing a centralized audio conference service.

FIG. 1 illustrates a prior art design for implementing a centralized audio conference service. The teleconferencing system comprises a conference bridge CB and several terminals UE that communicate with it. Each terminal UE receives the terminal user's speech by a microphone and encodes the speech signal with a speech codec known per se. The encoded speech is transmitted to the conference bridge CB, which decodes the speech signal from the received signal. The conference bridge CB combines the speech signals received from different terminals in an audio processing unit APU using a prior art processing method, after which the combined signal comprising several speech signals is encoded by a speech codec known per se and transmitted back to the terminals UE, which decode the combined speech signal from the received signal. An audible audio signal is produced from the combined speech signal by loudspeakers or headphones. To avoid harmful echo phenomena, the audio signal transmitted to the conference bridge by a terminal is typically removed from the combined audio signal to be transmitted to that terminal.

The combined signal is produced in the conference bridge typically as a single-channel (monophonic) audio signal or as a two-channel (stereophonic) audio signal. In the conference bridge, a spatial effect, known as spatialization, can be created artificially in a two-channel audio signal. In that case the audio signal is processed to give the listeners the impression that the conference call participants are at different locations in the conference room. In that case the audio signals to be transmitted on different audio channels differ from one another. When a single-channel audio signal is used, all speech signals (i.e. the combined signal) are transmitted as mixed on the same audio channel.

Regardless of whether only one or more audio channels are used, typically only one data transmission channel is used for transmitting speech. In a video conference, for example, the same data transmission channel can also be used for transmitting video images. To minimize the bandwidth used on the data transmission path, the audio signals to be transmitted between the conference bridge and the terminals are encoded/decoded by using a speech or audio codec supported by the system.

In this application the speech or audio codec refers to the means for encoding analogue or digital non-compressed audio information, typically speech, into digital audio/speech parameters before channel coding that may take place before the transmission path. Correspondingly, when audio information is received, the speech or audio codecs comprise means for converting audio/speech parameters that typically arrive from channel decoding into digital non-compressed audio information, which can be converted into analogue audio information in reproduction. Thus different speech or audio codecs or codec modes can be used on different audio channels of a stereophonic audio signal, for example, but conceptually these constitute one audio codec. Thus the term codec refers both to audio codecs in the traditional sense, such as different waveform codecs, and to speech codecs used in various systems.

Prior art teleconferencing systems, which are variations of the basic design presented above, are described e.g. in U.S. Pat. No. 6,125,115, U.S. Pat. No. 5,991,385 and WO 99/53673.

A problem related to these solutions is that the systems are inflexible in respect of different speech situations that appear during a conference call, particularly in respect of optimization of the speech coding used. Certain speech codecs with a low bit rate use a narrow bandwidth but cannot often perform good speech coding in various speech situations. On the other hand, speech codecs with a high bit rate or waveform codecs which are capable of quality speech coding use a lot of bandwidth. This inevitably results in non-optimal utilization of the bandwidth used in data transmission, which is a significant disadvantage, especially in packet-switched networks with a limited bandwidth.

BRIEF DESCRIPTION OF THE INVENTION

The object of the invention is to provide a method and an apparatus implementing the method to solve the above-mentioned problems. The objects of the invention are achieved with a method, a conference bridge apparatus and a terminal which are characterized by what is disclosed in the independent claims.

The preferred embodiments of the invention are disclosed in the dependent claims.

The invention is based on the idea that a conference call is controlled in a system which comprises a conference bridge for combining audio signals arriving from several terminals and for transmitting the combined signal further to at least one terminal, typically to several terminals, using at least one transmitting codec, the conference bridge comprising a spatialization unit. The method of the invention comprises first determining the number of substantially simultaneously active pre-determined audio components, such as speech signals, from the audio signals of the conference bridge inputs, and selecting at least one transmitting codec for use on the basis of the number of simultaneously active pre-determined audio components. The audio signal combined in the conference bridge is transmitted using the selected transmitting codec to at least one terminal, typically to several terminals. The conference bridge may comprise a separate spatialization unit for each terminal, in which case each participant receives a different sound image of the conference space. Furthermore, the speech signal of a participant can also be removed from the combined audio signal that is transmitted back to this participant.

According to a preferred embodiment of the invention, if there is only one simultaneously active pre-determined audio component, the combined signal is encoded by a first audio codec, which typically has a low bit rate, and transmitted to at least one terminal, or if there is more than one simultaneously active pre-determined audio component, the combined signal is encoded by a second audio codec, which typically has a high bit rate, and transmitted to at least one terminal.

According to another preferred embodiment of the invention, if there is only one simultaneously active pre-determined audio component, the combined signal is transmitted to at least one terminal as a single-channel audio signal and the received single-channel audio signal is spatialized in the terminals. If there is more than one simultaneously active pre-determined audio component, the combined signal is transmitted in spatialized format to at least one terminal as a multi-channel audio signal.

An advantage of the method according to the invention is that it allows optimization of the selection of the transmitting codec to be used so that the codec selected codec always guarantees a sufficiently good voice quality in relation to the number of simultaneous speech signals, while the bandwidth used is kept at the minimum. An advantage of a preferred embodiment of the invention is that the use of an audio codec with a low bit rate saves a lot of bandwidth, while a sufficiently good voice quality is achieved for one speech signal. Correspondingly, by using an audio codec with a high bit rate or a waveform codec for several simultaneously active audio signals, a sufficiently good voice quality for the combined audio signal can be preferably guaranteed regardless of the number of simultaneous speech signals of a conference call. At the same time, however, the use of bandwidth is optimised since a large bandwidth is used only when it is absolutely necessary for guaranteeing the voice quality.

A further advantage of the invention is that it allows to guarantee a sufficiently good voice quality for a three-dimensional spatialized audio signal, in which case a three dimensional spatial effect of the other conference call participants can be created for a conference call participant.

An advantage of a further preferred embodiment of the invention is that the bandwidth to be used can be optimised as follows: when there is only one simultaneously active speech signal, a combined audio signal is transmitted and encoded in such a manner that it uses as little bandwidth as possible but is, however, capable of transmitting both sufficient voice quality and information needed in spatialization. If there are several simultaneously active speech signals, it is most advantageous in respect of the voice quality and the bandwidth to perform spatialization already in the conference bridge and then select a transmitting codec for the combined audio signal to be transmitted that allows transmission of a signal with a sufficient quality while the use of bandwidth is minimized.

BRIEF DESCRIPTION OF THE FIGURES

The invention will now be described in greater detail by means of preferred embodiments with reference to the accompanying drawings, in which.

DETAILED DESCRIPTION OF THE INVENTION

The invention will be described here on the general level without restricting the invention to any particular telecommunications system. The advantages of the invention are most apparent in various packet-switched networks, such as the GSM-based GPRS network, the UMTS network, and in teleconferencing arrangements used via the Internet. The invention is not, however, limited to packet-switched networks only, but it also provides advantages in traditional circuit-switched telecommunications networks where the transmission path not used in audio coding can be employed for transmitting video images, for example. Furthermore, the invention can utilize different audio and speech codecs, such as EFR/FR/HR speech codecs ((Enhanced) Full/Half Rate Codec) and AMR and Wideband AMR speech codecs (Adaptive Multirate Codec) known per se from GSM/UMTS systems, such as G.722, G.722.1, G.723.1, G.728, various waveform codecs, such as G.711, and codecs used in MPEG1, MPEG2 and MPEG4 audio coding, such as an AAC codec (Advanced Audio Coding), which are suitable for encoding/decoding different audio formats. The term audio codec thus refers both to audio codecs in the traditional sense, such as various waveform codecs, and to speech codecs used in different systems and codecs with a scalable bit rate, such as CELP+AAC according to MPEG4.

Figure 2:
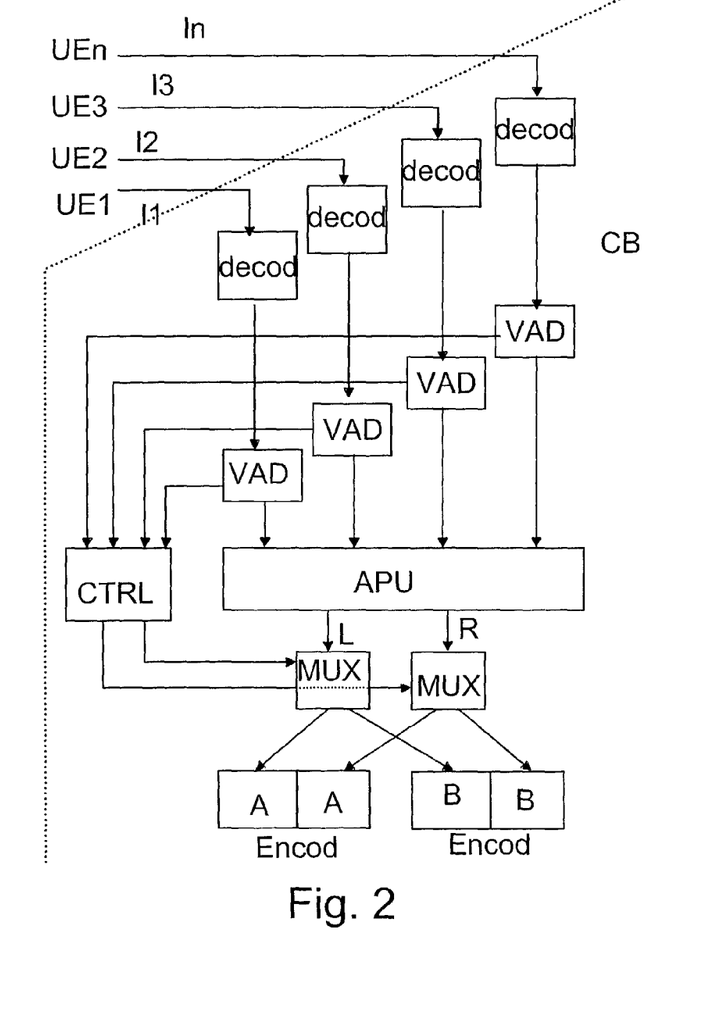
FIG. 2 shows a conference bridge arrangement according to a first embodiment of the invention.

The first aspect of the invention will be described in the following with reference to FIG. 2. FIG. 2 shows a conference bridge CB, which comprises inputs $(I_1, \ldots, I_n)$ for receiving audio signals arriving from several terminals $(UE_1, \ldots, UE_n)$. The audio signals arriving from the terminals are typically encoded with a transmitting codec known per se, and thus the audio signals are correspondingly decoded by a receiving codec $(Decod_1, \ldots, Decod_n)$ connected to each input. However, encoding of audio signals by terminals and decoding in the conference bridge are not relevant to the invention. Audio signals generated in the conference bridge, such as background sounds or effects that are to be attached to the audio signal to be combined, can be fed into one or more of the above-mentioned inputs. The audio signals of the inputs are supplied to an audio processing unit APU, where the audio signals are combined in a desired manner, which may comprise signal mixing, spatialization, filtering or other desired processing methods, as a result of which typically either a monophonic or a stereophonic combined output audio signal is produced. It should be noted that in addition to different audio components, the audio signals comprise control information, and thus a combined audio signal arriving from the conference bridge may comprise a monophonic audio signal which has been supplied through the conference bridge as such and to which only control information has been attached from the other inputs. Thus any audio signal arriving from the conference bridge is regarded as a combined audio signal.

Audio signals entering the conference bridge typically comprise different audio components, such as speech, other speech-like sounds, e.g. coughs, background noise and possibly above-mentioned artificially created audio signals. As regards further processing of the combined audio signal to be transmitted from the conference bridge, it is essential for the method of the invention that one is able to determine from the incoming audio signals how many of them comprise substantially simultaneously audio components, typically speech, that are to be transmitted to the other participants of the conference call in the combined audio signal.

According to a first embodiment of the invention, this determination can be implemented by an arrangement shown in FIG. 2, where each conference bridge input comprises, preferably after the receiving codec (Decod), a VAD unit ($VAD_1, \ldots, VAD_n$, Voice Activity Detection), which is arranged to detect speech in a received audio signal. In practice an audio signal arriving in the VAD unit is arranged in frames, each of which comprises N samples. The VAD unit checks each frame and, as a result of the check, sends a control signal indicating whether or not active speech was found in the frame checked to the control unit CTRL. Thus a control signal from each VAD unit is supplied to the control unit CTRL, i.e. n control signals altogether, from which the control unit CTRL can determine at least whether the frames of the incoming audio signals comprise simultaneously one or more active speech signals. This can be implemented e.g. as follows: the control signals arriving from the VAD unit are signals enabling Boolean algebra (e.g. speech=1, no speech=0), in which case the control unit can be implemented by means of simple OR or XOR ports, for example. In that case the output of the control unit will be a Boolean signal indicating whether the frames include simultaneously 0 or 1 active speech signal (e.g. signal value=0) or 2 or more simultaneously active speech signals (e.g. signal value=1).

In this arrangement the VAD units can be replaced by means which employ audio signal checking, known as ACD units (Audio Content Detector), which analyze the information included in an audio signal and detect the presence of the desired audio components, such as speech, music, background noise, etc. The output of the ACD unit can thus be used for controlling the control unit CTRL in the manner described above.

Furthermore, the receiving audio component can be detected using meta data or control information preferably attached to the audio signal. This information indicates the type of the audio components included in the signal, such as speech, music, background noise, etc.

The output signal of the control unit CTRL is used for controlling audio coding of the combined audio signal to be transmitted from the conference bridge preferably as follows: if at most one desired audio component, such as speech, is detected simultaneously in the audio signals arriving from the terminal UE, the combined audio signal is encoded by an audio codec with a low bit rate and transmitted to the terminals. Use of an audio codec with a low bit rate preferably saves bandwidth considerably while a sufficiently good voice quality can be provided for one speech signal. Correspondingly, if at least two desired audio components, such as speech, are detected in audio signals arriving from the terminal UE, the combined audio signal is transmitted to the terminals and encoded so that a sufficiently good voice quality is achieved for several simultaneous speech signals. In that case encoding can be performed by an audio codec with a high bit rate or a waveform codec, for example. This preferably guarantees a sufficiently good voice quality for the combined audio signal regardless of the number of simultaneous speech signals included in the conference call. At the same time, however, the use of bandwidth is optimized so that a large bandwidth is used only when it is absolutely necessary for guaranteeing the voice quality.

When a combined audio signal is produced, it should be noted that audio components which have arrived from a certain terminal are not to be included in the combined audio signal to be transmitted to this terminal because it would cause a disadvantageous echo phenomenon in the reception of the audio signal. This should be taken into account when simultaneously active speech signals are determined for the combined audio signal to be transmitted to each terminal, which influences the selection of the audio codec to be used. It should also be noted that a differently encoded combined audio signal can be transmitted to different terminals e.g. in a situation where the terminals of two different telecommunications systems, e.g. a mobile station and a fixed (PSTN) telephone, participate in the same conference call. In that case the terminals typically use very different audio codecs.

In FIG. 2 the audio processing unit APU supplies the combined audio signal either in stereophonic form, in which case a separate multiplexer MUX is arranged both for the left (L) and the right (R) audio channel, or in monophonic form, in which case only one of the above-mentioned audio channels is in use, e.g. the left (L) one. The output signal of the control unit CTRL is used for controlling the multiplexers to select a suitable transmitting codec or transmitting codec mode for the audio frame of the audio channel of the combined audio signal. If it is detected in the output signal of the control unit CTRL that the incoming audio signals of the conference bridge CB simultaneously comprise at most one desired audio component (e.g. the output signal value=0), the multiplexer(s) MUX is(are) controlled to select transmitting codec A (EncodA), for example. Correspondingly, if it is detected in the output signal of the control unit CTRL that the incoming audio signals of the conference bridge CB simultaneously comprise at least two desired audio components (e.g. output signal value=1), the multiplexer(s) MUX is (are) controlled to select transmitting codec B (Encod B). The selected transmitting codec or the transmitting codec mode (A/B) is used for the audio frames of the combined audio signal until the value of the control unit CTRL output signal changes and controls the multiplexer to switch the transmitting codec or the transmitting codec mode.

It should be noted that not only can the output signal of the control unit CTRL be used for controlling codec switching from codec A to codec B, but also for controlling the switching between the modes of the same codec from mode A to mode B. Depending on the implementation of the system and the terminals, the codec to be used can be switched e.g. from an AMR codec with a bit rate of 12.2 kbit/s to a waveform codec G.711 with a bit rate of 64 kbit/s. Correspondingly, the switching between the modes of one and the same codec can be performed e.g. as a AMR internal mode switch e.g. from a bit rate of 12.2 kbit/s to a bit rate of 5.9 kbit/s. In that case the selection of the codec mode is preferably controlled by not reducing the bit rate of the codec too much during several simultaneous speech signals even though the quality of the data transmission channel would require this.

In addition, it should be noted that, if necessary, a different codec or codec mode can be used for different audio channels in the case of a stereophonic audio signal. For example, in the case of a conference call where both speech and music are to be transmitted in the combined audio signal, it is preferable to use a different audio codec or codec mode for these audio components (speech/music). In stereophonic reproduction this can be preferably implemented by transmitting the speech via the left audio channel, for example, and controlling the multiplexer of the left audio channel to select a suitable audio codec or codec mode for speech. Music is transmitted via the right audio channel and the multiplexer of the right audio channel is controlled to select a suitable audio codec or codec mode for music. Thus the type of the audio component to be encoded (speech, music, sound effects, etc.) can preferably also influence the selection of the transmitting codec.

It is also possible to use the same audio codec or the same codec mode for all audio channels of the stereophonic/multichannel combined audio signal, in which case all audio channels are coded using one audio codec.

Figure 3:
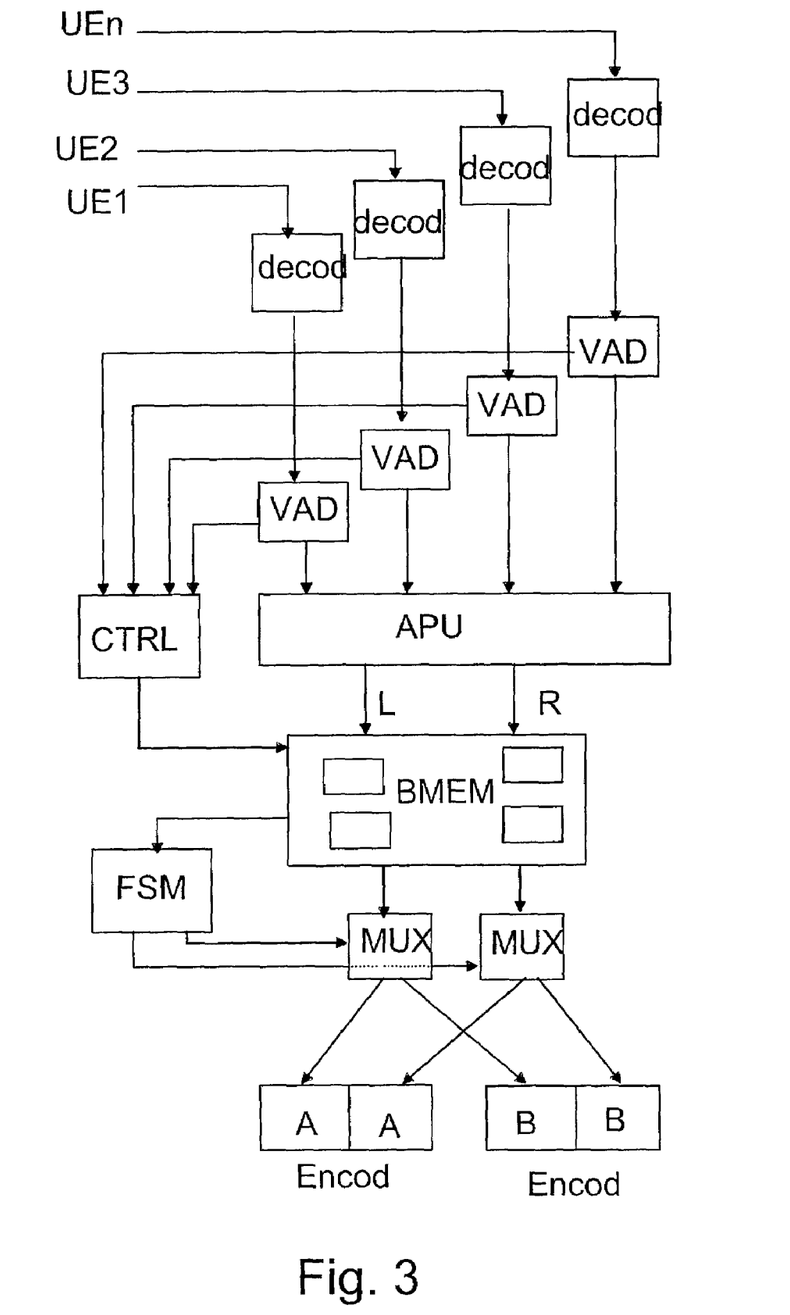
FIG. 3 shows a conference bridge arrangement according to a second embodiment of the invention.

According to a second embodiment of the invention, the switching of the transmitting codec or the mode of the transmitting codec described above can also be implemented by the arrangement illustrated in FIG. 3. Also in this case the input of each conference bridge comprises, preferably after the receiving codec (Decod), a VAD unit ($VAD_1, \ldots, VAD_n$, Voice Activity Detection), which is arranged to detect speech in the audio frames of the received audio signal. The VAD unit checks each frame and as a result of the check transmits a control signal indicating whether or not active speech was found in the frame checked to the control unit CTRL. From the control signals received from each VAD unit the control unit CTRL determines e.g. in the manner described above whether the frames of the incoming audio signals simultaneously comprise one or more active speech signals. The audio frames of the audio signals of different inputs are fed into an audio processing unit APU, which forms a combined audio signal, whose audio frames are fed further into a buffer memory BMEM. At the same time, the result of the determination described above and obtained from the control unit CTRL is attached to each audio frame of the combined audio signal as a separate flag (e.g. one bit). Thus each audio frame of the audio signal stored in the buffer memory includes information which indicates whether the audio frame in question comprises simultaneous speech from one or more the conference bridge inputs.

Now the information indicated by the above-mentioned flag can be preferably utilized in the selection of the transmitting codec: the codec or its mode to be used is selected according to the flag value included in several successive audio frames. Thus the codec or its mode to be used can be determined e.g. from the value of the flags of three successive audio frames. Consequently, unnecessary switching of the codec or its mode can preferably be avoided in a situation where a single audio frame or e.g. two successive audio frames comprise an additional noise burst, such as background noise, which the VAD unit misinterpreted as speech simultaneously with a real speech signal. If the flag values of the audio frames in the buffer indicate that the codec or its mode will be immediately switched back to the same codec or mode that was just used, the multiplexers are preferably controlled so that the codec or its mode is not switched at all. If the flag values of all three audio frames indicate that the codec or its mode should be switched, the multiplexers are controlled to perform the switch. It is clear that three audio frames is only an example of how many audio frames can be examined in this connection. The suitable number of audio frames may naturally vary depending on the implementation of the system, and the number of audio frames to be examined is not necessarily the same as the number of audio frames stored in the buffer. Since buffering always causes a delay in data transmission between the sound source and the listener, it is preferable to keep the number of frames to be stored in the buffer small, e.g. three frames. However, the length of a frame can be changed in the conference bridge, in which case the number of frames that fits in the buffer may also vary. In respect of audio signal processing, it is advantageous to keep the length of the audio frame produced by the conference bridge the same as the frame length of the codec in use, the length being typically a few tens of milliseconds (e.g. 20 ms in the AMR), but the length of the audio frame produced by the conference bridge may also differ from the length of the codec frame.

Examination of the flag values of the audio frames in the buffer and controlling of the multiplexers can be preferably performed by another control unit, which can be e.g. a finite state machine FSM according to FIG. 3. The state machine has information on which codec or mode was used for the audio frame encoded last and what the value of the flags of the next audio frames in the buffer is (a certain number or all audio frames included in the buffer). The state machine may preferably comprise several different deduction models for which codec or mode to select next. Based on the deduction used, the state machine generates a control signal to be transmitted to the multiplexers.

According to a preferred embodiment, the buffer memory is not needed at all but all the information on the flag values included in the audio frames is supplied to the state machine FSM directly from the control unit CTRL. Flag values of several audio frames are preferably stored slidingly in the state machine, and thus the values of the control signals to be transmitted to the multiplexers are formed from the flag values of earlier audio frames and from predictable long-term changes.

According to a preferred embodiment of the invention, separate VAD units are not necessarily needed at all but VAD detection can be performed directly in the receiving codec (Decod) of each conference bridge input. In that case the receiving codec is arranged to detect the contents of the received frames, i.e. whether they include speech or not. This detection is carried out according to the type of the received frame: the codec determines whether the frame includes speech or some interference caused by background noise. This can be used for determining the value of a 'speech flag'; if the value of the speech flag indicated that the audio frame includes speech, this indication can be supplied directly from the receiving codec to the control unit CTRL without a separate VAD unit in between. This preferably saves processing capacity in the conference bridge CB because separate VAD calculation is not needed. The VAD detection in the receiving codec is known per se to a person skilled in the art and described in greater detail in application WO 01/08136.

According to a preferred embodiment, the embodiments described above can take account of the location difference created artificially in spatialization of different sound sources (inputs). In spatialization one creates an artificial space model of the conference room where each conference call participant is placed in a separate location. The space model is transmitted to the terminals as a combined stereo/n-channel audio signal. It is generally known that spatialization of this kind can be performed e.g. as HRTF filtering (Head Related Transfer Function), which produces binaural signals for the listener's left and right ear. Spatialization can also be performed only by modifying the time differences (Interaural Time Difference) or the amplitude differences (Interaural Amplitude Difference) between the signals. If there are e.g. two simultaneously active sound sources (speech signals) but these are far apart in the simulated conference room with respect to the listener, e.g. one left to the listener and the other right to the listener, switching of the transmitting codec from an audio codec with a low bit rate to a waveform codec may not be necessary, but a sufficient spatial difference also provides a sufficient difference between different audio signals. This difference is transmitted to the listeners also when it is encoded with an audio codec with a low bit rate. It can thus be stated that selection of the transmitting codec is a function the factors of which do not only include the number of simultaneously active speech signals but also the spatial difference between the speech signals.

Figure 4:
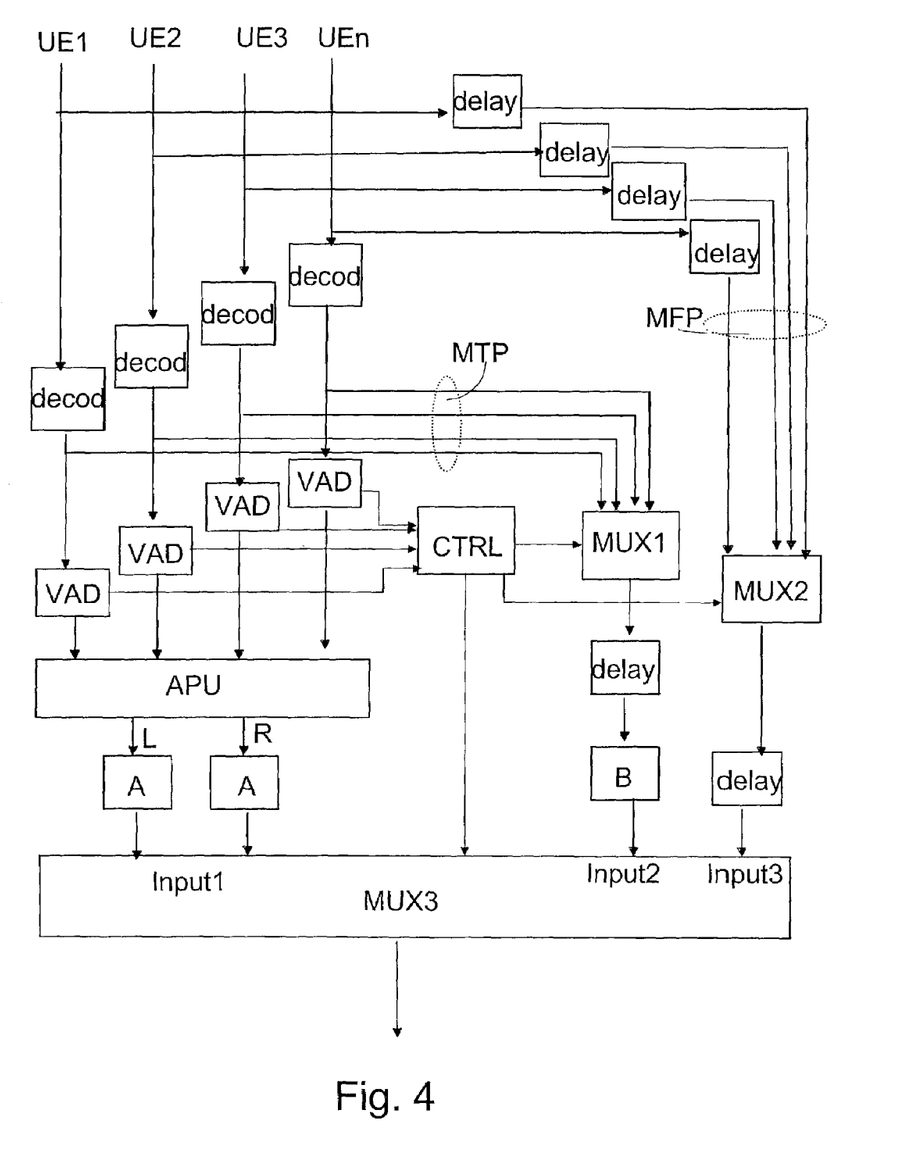
FIG. 4 shows a conference bridge arrangement according to a third embodiment of the invention.

Another preferred embodiment of the invention can be illustrated by FIG. 4. FIG. 4 shows an alternative embodiment for the conference bridge, which, like above, comprises n audio signal inputs to which both receiving codecs (Decod) and means for VAD detection are connected. The audio inputs can be supplied further to an audio processing unit APU in the same way as above. In the audio processing unit APU the audio inputs are combined and processed to produce a spatialized stereo signal. Both stereo signals are supplied further to transmitting codecs A for encoding.

In addition, the audio inputs are transferred along two other paths inside the conference bridge, i.e. a monophonic transcoding path (MTP) and a monophonic transmission path (MFP). The monophonic transcoding path branches off from the path described above after the receiving codecs (Decod), from which the path goes to a first multiplexer MUX1. From the multiplexer MUX1 the audio signal is, if necessary, supplied via a delay circuit to the transmitting codec B for encoding. The monophonic transmission path, on the other hand, goes directly from the audio inputs via delay circuits to a second multiplexer MUX2 without decoding by the receiving codecs. If necessary, the audio signal is supplied from the multiplexer MUX2 to another delay circuit. Delay circuits are needed because different processing operations which cause different delays are performed on audio signals propagating along different paths. By means of additional delay circuits audio signals propagating along different paths can be kept temporally synchronized.

VAD detection is performed on audio inputs to determine in the manner described above whether there are one ore more simultaneously active speech signals. If there is only one simultaneously active speech signal, a control signal is transmitted either to the first multiplexer (MUX1) or to the second multiplexer (MUX2), depending on whether transcoding of audio signals is needed. On the basis of the control signal, either of the multiplexers lets the audio signal containing one speech signal through to the delay circuit following the multiplexer. If the same receiving codec and the same mode of the transmitting code are used in the conference bridge, the audio signal does not need additional transcoding, but the audio signal can be supplied to the second multiplexer MUX2 along the monophonic transmission path (MFP). If the receiving codec and the transmitting codec or their modes differ from each other, the received audio signal must first be decoded and then encoded with another transmitting codec or mode. In that case the audio signal is supplied to the first multiplexer MUX1 along the monophonic transcoding path (MTP).

The control signal to be transmitted to the multiplexer preferably also includes information on which one of the audio inputs comprises the speech signal. This information may also be spatial location information modelled for the user. The VAD detection is also employed for generating the control signal that is transmitted to the control unit and used for controlling a third multiplexer MUX3 to select the correct input (Input 1, 2, 3). The first input (Input1) arrives from the transmitting codecs A that encode the spatialized stereo signal. The second input (Input2) is the input from the monophonic transcoding path (MTP) via the transmitting codec B. The third input (Input 3) is the input from the monophonic transmission path (MFP) via the delay circuit.

Which input of the third multiplexer MUX3 is selected depends on the number of simultaneous speech signals detected in VAD. If there are several simultaneous speech signals, the spatialized stereo signal is selected for transmission via the transmitting codecs A, i.e. the first input (Input1). If there is only one simultaneous speech signal, the second input (Input2) or the third input (Input3) is selected. The selection between these two inputs is made according to whether or not the transmitting codec used for the combined audio signal to be transmitted to the terminals is the same as the codec used for the audio signals arriving in the conference bridge from the terminals. If the transmitting codec of the combined signal is not the same, the incoming audio signals must be decoded and then re-encoded with the transmitting codec B, in which case the second input (Input2) is selected as the input for the third multiplexer MUX3. If the transmitting codec used for the combined audio signal is the same as the one used for the audio signals arriving in the conference bridge from the terminals, decoding and re-encoding are not necessary, but the audio signals can be multiplexed in the second multiplexer MUX2 and supplied as such to the third multiplexer MUX3 via the third input (Input3).

If several simultaneously active speech signals are detected in this embodiment, the combined audio signal is spatialized in the conference bridge, preferably in its audio processing unit APU, after which the spatialized stereo/n-channel audio signal is transferred to transmission via a transmitting codec A suitable for this kind of signal. On the other hand, if only one simultaneously active speech signal is detected, a combined audio signal is generated in the conference bridge by attaching information enabling spatialization at the receiving end to it, such as the audio signal identifier of the terminal that generated the active speech signal or spatial location information of the terminal. This combined audio signal and the information enabling spatialization attached to it are transmitted as a monophonic audio signal to the terminals, which create a spatial effect in the received audio signal by means of the information that enables spatialization.

The bandwidth to be used can also be optimized by this embodiment of the invention: if there is only one simultaneously active speech signal, the combined audio signal is encoded and transmitted so that it uses as little bandwidth as possible but can transmit both a sufficient voice quality and the information needed in spatialization. If there are several simultaneously active speech signals, it is more advantageous in respect of the voice quality and the bandwidth to perform spatialization already in the conference bridge and then select a transmitting codec for the combined audio signal to be transmitted that allows transmission of a sufficiently good signal and minimization of the bandwidth used.

Figure 5A:
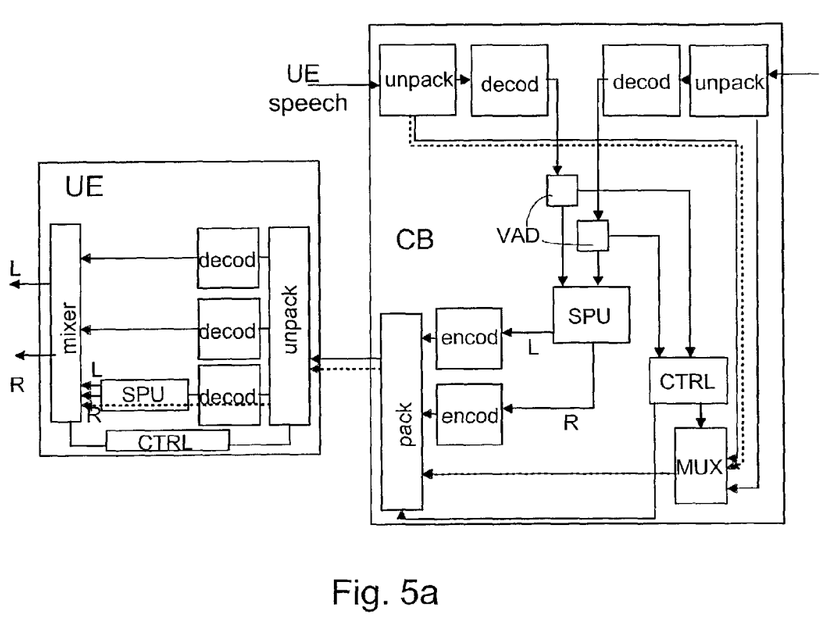
FIGS. 5a and 5b show a teleconferencing arrangement according to a third embodiment of the invention when one or more simultaneously active speech signals are detected.
Figure 5B:
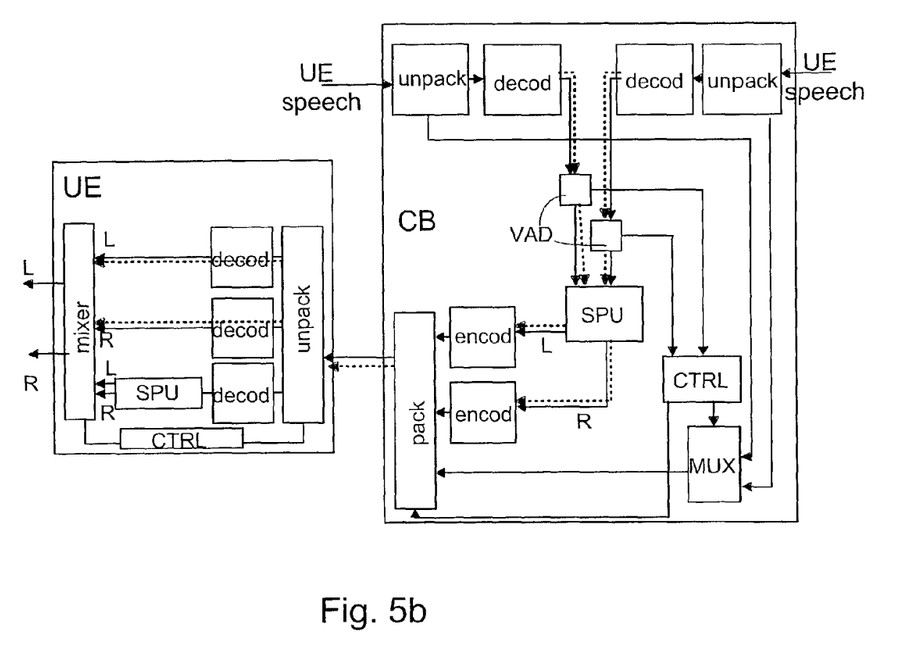

The different situations of this embodiment according to the invention where either only one or several simultaneously active speech signals are detected are illustrated by means of FIGS. 5a and 5b. In FIGS. 5a and 5b the path of the audio signals in the conference bridge and terminal is marked with a dash-dot line. FIG. 5a shows a situation where only one conference call participant is speaking actively. In the VAD of the conference bridge it is detected that there is only one simultaneously active speech signal. If it is further detected that the terminal transmitting this active speech signal uses the same audio codec in the same mode for encoding the audio signal to be transmitted as the other terminals of the conference call should use for decoding the combined audio signal, transcoding of the audio signals can be preferably avoided altogether. The detection of the codecs can be performed in the conference bridge by comparing the type of the received speech frame with codec types that are known to be used for encoding the combined signal for terminals. In that case the received audio signal is supplied as such to a (second) multiplexer, where the audio signal is combined with the control information included in the other inputs. If it is noticed that the terminal transmitting the active speech signal in question encodes the audio signal to be transmitted using a codec or a mode of the same codec different from the ones the other terminals of the conference call use for decoding the combined audio signal, the audio signal must be transcoded. In that case the received audio signal is decoded in the receiving codec (Decod) and supplied to the (first) multiplexer, where the audio signal is connected to the control information included in the other inputs. This combined audio signal is then supplied to another audio codec or audio codec mode for encoding via a delay circuit. The information enabling spatialization is attached to the combined audio signal e.g. in connection with multiplexing. This information can be e.g. the audio signal identifier of the terminal that produced the active speech signal or spatial location information of the terminal. Before the audio signal is transmitted to the transmission path, the audio encoded audio frames may be channel coded.

It should also be noted that the terminals participating in the conference call may use different receiving codecs, and thus transcoding can be avoided for one receiving terminal whereas for some other terminal, which uses an incompatible codec, this cannot be avoided.

Correspondingly, the receiving terminal decodes the channel coding and the audio information by a receiving codec. The decoded audio information is supplied further to a spatial processing unit SPU, which creates spatial effect in the received audio signal by means of the information enabling spatialization. The audio signal spatialized this way is supplied to the terminal user over a loudspeaker(s) or headphones so that the user can get a spatial impression of who of the conference call participants is talking and from which direction the sound comes.

FIG. 5b illustrates a situation where two simultaneous speech signals from two different conference call participants are noticed in VAD detection. To illustrate the situation, FIG. 5b shows only two inputs for the conference bridge but naturally the number of inputs (and of simultaneous speech signals) can be larger. Audio signals detected at the same time are supplied to the audio processing unit APU of the conference bridge, where the audio signals are combined and the combined audio signal spatialized. The spatialized stereo/n-channel signal is encoded with a suitable audio codec, after which the audio encoded audio frames are typically channel coded before the audio signal is transmitted to the transmission path.

The receiving terminal decodes the channel coding and the audio information with a receiving codec. Since the received audio information has been spatialized already upon transmission, the spatialized stereo/n-channel audio signal can be supplied directly from decoding to the user of the terminal over a loudspeaker(s) or headphones so that the user can get a spatial impression of who of the conference call participants are talking and from which directions the sounds come.

Several embodiments of the invention where the audio signal is spatialized either in the conference bridge or in the receiving terminal were described above. According to a preferred embodiment of the invention, the spatialization process can be divided into at least two steps that are performed in the conference bridge and in the receiving terminal. In that case spatial preprocessing is performed on the audio signal in the conference bridge, which produces a combined audio signal which is transmitted to the terminal, where the combined audio signal is supplied further to the spatial processing unit SPU for post-processing before reproduction to the listener. An example of spatialization of this kind is 'matrixed encoding' where active audio signals are combined in the conference bridge into a combined N-channel signal (e.g. according to the Ambisonic technique), which is transmitted to the terminal. The terminal processes this N-channel signal and produces a spatialized and reproducible audio signal which is suitable for the loudspeakers or headphones. If only one active speech signal is detected in the conference bridge in this case, the combined N-channel signal can be encoded using a low bit rate. Correspondingly, if several active speech signals are detected in the conference bridge, the combined N-channel signal can be encoded using encoding of a better quality. This preferably also allows optimization of the use of bandwidth with respect to the audio signal quality.

Figure 6:
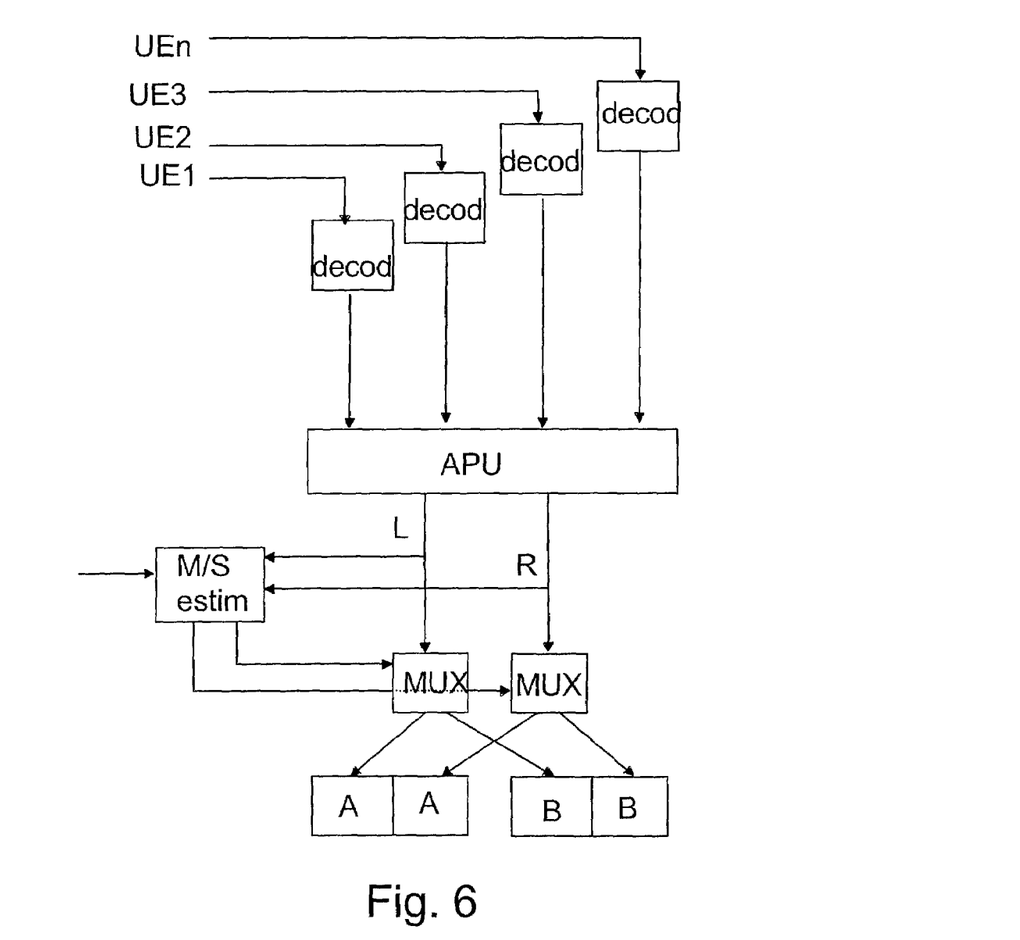
FIG. 6 shows a conference bridge arrangement according to a fourth embodiment of the invention.

According to a preferred embodiment of the invention, if a stereophonic combined audio signal including spatialization is produced in the conference bridge, simultaneous speech signals can be determined from the output of the conference bridge spatializer, and thus VAD detection is not needed at all. This is illustrated in FIG. 6. From the output of the audio processing unit APU, which in this embodiment functions as a spatializer, the spatialized stereo signals (left L and right R) are supplied to a mono/stereo estimator (M/S estimator), which analyzes the signals and determines whether the audio signal comprises at most one speech signal or whether there are several simultaneous speech signals. Based on the determination, a control signal is transmitted from the mono/stereo estimator to the multiplexers in a manner corresponding to what was described in connection with VAD detection: if only one simultaneous speech signal is detected in the spatialized audio signal, the multiplexers are controlled to select e.g. an audio codec with a low bit rate for the audio signal; if at least two simultaneous speech signals are detected in the spatialized audio signal, the multiplexers are controlled to select e.g. an audio codec with a high bit rate or a waveform codec for the audio signal. The operation of the mono/stereo estimator is known per se to a person skilled in the art and described in greater detail in EP application 955789.

It should be noted that the embodiment described above typically functions only in connection with a spatialized audio signal. If the audio processing unit APU is implemented as a mixer where the incoming audio signals are only added together, the mono/stereo estimator interprets that the combined audio signal comprises only one speech signal in every situation. Thus the embodiment described above is most advantageous if the combined audio signal produced by the conference bridge is a spatialized stereo/n-channel audio signal.

According to a preferred embodiment, detection methods based on the location of sound sources created artificially in spatialization can be used in connection with the mono/stereo estimator or a similar detection system. In spatialization an artificial spatial model of the conference room is created where the different conference call participants are provided with locations of their own. The different locations for the different participants are created by means of inter-channel time and amplitude differences produced in the signal components of the stereo/n-phonic audio signal. An estimate of how many sound sources are in simultaneous use can be formed by determining the time and amplitude differences in the mono/stereo estimator, for example. Furthermore, if only one sound source is in use, the location information of all sound sources can be supplied to the detection system and if the sound sources are in different locations, the detection system can determine which sound source is in use at a given time.

Figure 7:
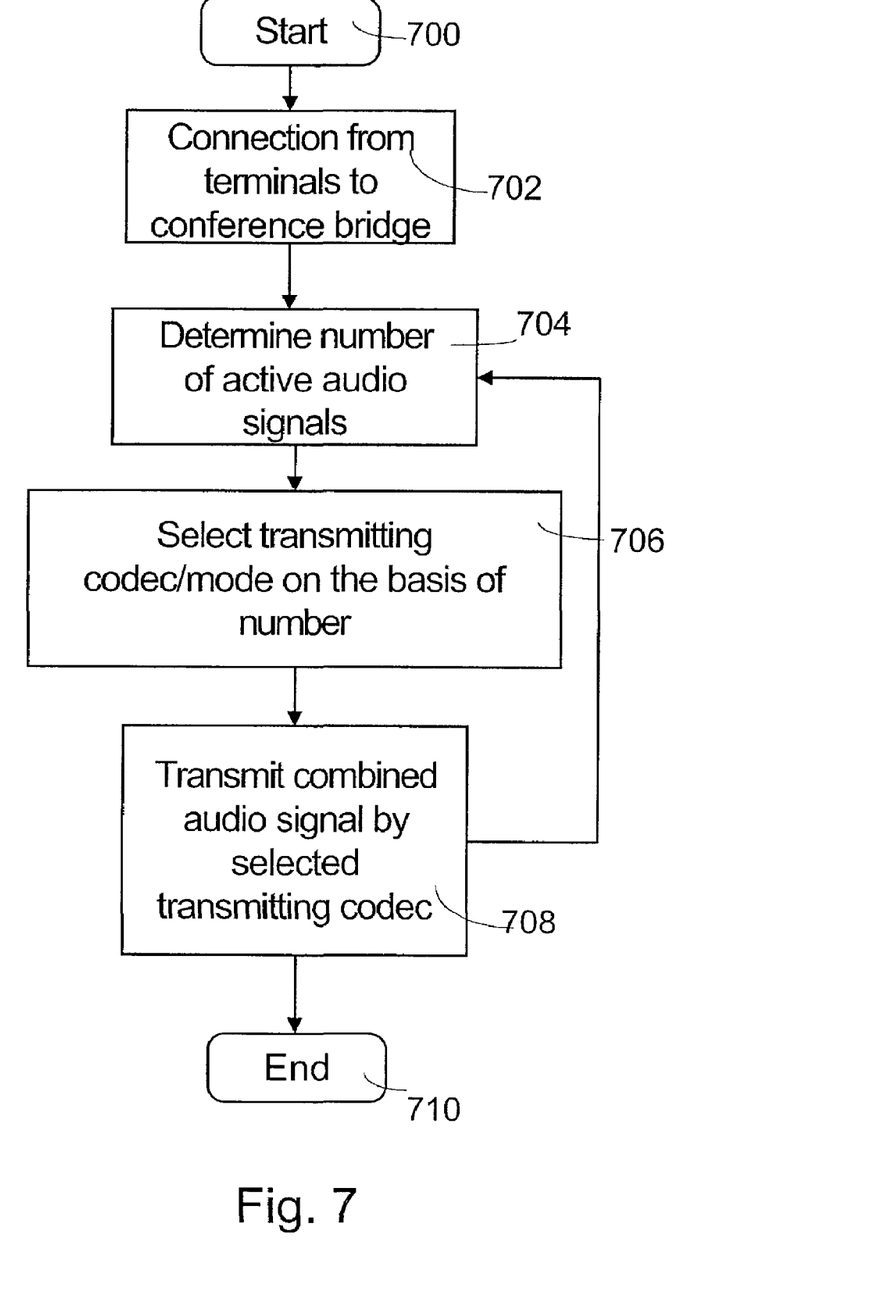
FIG. 7 is a flow chart showing the essential steps of a method according to the invention.

Implementation of the essential method steps according to the invention can be generally illustrated by a flow chart shown in FIG. 7. Various embodiments of the invention were described above. However, these embodiments have certain common steps that are essential to the implementation to the invention. These are illustrated in FIG. 7. If we examine the conference bridge, in the initial situation (700) several terminals connected to different inputs (702) of the conference bridge participate in the conference call. In the conference bridge the number of (704) of certain audio signals that are simultaneously active is determined from the audio signals of the inputs. These certain audio signals are pre-determined audio signals, which are typically speech signals, but may also be some other audio signals, such as music or spatial sounds created artificially in the conference bridge. At its simplest the above-mentioned determination of the number comprises distinction between one and several simultaneously active audio signals, but the exact number of the active audio signals can also be determined.

Next at least one transmitting codec or mode of transmitting codec is selected for use based on the number of simultaneously active predetermined audio signals (706). This selection is made considering, preferably in the manners described in connection with different embodiments, the fact that a sufficiently good voice quality should be guaranteed for the combined audio signal regardless of the number of the simultaneous speech signals in the conference call, while the use of bandwidth should be optimized so that a large bandwidth is used only when it is absolutely necessary for guaranteeing the voice quality.

In the last essential step the audio signal combined in the conference bridge is transmitted to at least one terminal using the selected transmitting codec (708). In a typical situation the combined audio signal is transmitted to all terminals by the same transmitting codec, but e.g. in a situation where terminals of two different telecommunications systems participate in the same conference call, the terminals typically use very different audio codecs, and consequently it may be necessary to use a transmitting codec for a combined audio signal to be transmitted to one terminal that differs from the codec used for the other terminals. It should also be noted that there is feedback from this step (708) to an earlier step where the number of substantially simultaneously active audio signals is determined from the audio signals of the inputs (704). Thus the number of simultaneously active audio signals is monitored constantly during the conference call and the transmitting codec can be preferably switched during a call connection.

The conference bridge is typically a server which is configured to a telecommunications network and the operation of which is managed by a service provider maintaining the conference call service. The conference bridge decodes the speech signal from the signals received from the terminals, combines these speech signals using a processing method known per se, encodes a combined audio signal with the selected transmitting codec and transmits it back to the terminals. The conference bridge may also be a terminal which may participate in the conference call but which is also arranged to support management of the conference call, typically management of control information on the conference call. Also in this case, however, the speech signals are typically combined into a combined audio signal as a network service in the conference bridge. Terminals that are partly capable of functioning as a conference bridge and support the conference call include Nokia® 9110 and 9210 Communicator. Furthermore, a set top box for the digital television network can function as a conference bridge. The conference bridge according to the invention comprises at least means for determining how many of the audio signals arriving in the conference bridge include substantially simultaneously audio components that are to be transmitted to other conference call participants in a combined audio signal. The conference bridge according to the invention further comprises means for controlling the selection of the transmitting codec for the combined audio signal on the basis of the above-mentioned determination.

Figure 8:
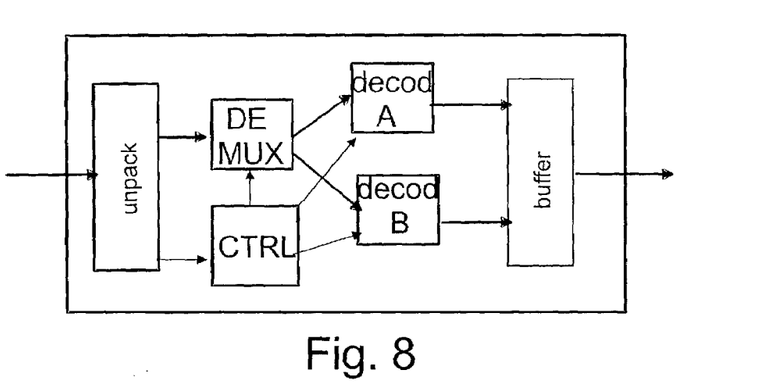
FIG. 8 shows a simplified structure of a terminal according to the invention.

In the method according to the invention the terminal used must support switching of the codec or its mode. FIG. 8 shows an example of this kind of terminal. The terminal receives a combined audio signal which is transmitted form the conference bridge and includes an indication of the switching of the codec or its mode. The terminal separates the codec type indication from the rest of the audio signal and feeds it into the control unit. On the basis of the type indication the control unit produces a control signal for transmission to the demultiplexer, which can feed audio frames into the selected codec for decoding using this indication. The control unit initializes the selected new codec preferably before the old codec (or mode) A is switched to a new codec (or mode) B. This preferably allows to avoid harmful breaks between the audio frames decoded by different codecs. To prevent codec switching from causing serious interference in the voice, the new encoder or decoder must be initialized before switching between encoders in the conference bridge or before switching between decoders in the terminal.

According to an embodiment, a good voice quality can be guaranteed using the new codec B of the conference bridge in parallel with the old codec A during a few frames after initialization. However, the frames of the new codec are not transmitted to the terminal at this point. This guarantees that the new codec B has activated speech encoding, which ensures that the new codec has already encoded the audio signal in question when the old codec is replaced with the new codec B.

According to an embodiment, this can also be performed in the terminal when the decoder is switched by encoding the audio signal decoded by the old decoder A in the terminal by the encoder B during a few frames. The new encoded frames are supplied to the new decoder B but they are not transmitted further. When the decoder A is switched to the decoder B, the decoder B has already decoded the audio signal in question. Both solutions require that the frames to be transmitted and received can be buffered.

To implement an embodiment of the invention, the terminal according to the invention also comprises a spatial processing unit SPU, which is used when a monophonic audio signal is transmitted from the conference bridge. This signal includes information enabling spatialization of the audio signal, such as the audio signal identifier of the terminal that produced an active speech signal or spatial location information on the terminal. The spatial processing unit SPU is used for creating a spatial effect in the received audio signal by means of the information enabling spatialization.

The invention was exemplified above by embodiments where the object is to determine whether the number of the simultaneous speech signals is one or more, in which case codec A (or mode A) is selected for the audio signal combined in the conference bridge if the number of simultaneous speech signals is one, and codec B (or mode B) if the number of simultaneous speech signals is two or more. However, the invention is not restricted to the determination of 'one/several simultaneous speech signals' described above, but the invention can also be applied by determining the exact number (0-n) of simultaneous speech signals and optimizing the selection of the transmitting codec to be used so that the selected codec always guarantees a sufficiently good voice quality in relation to the number of speech signals, while the bandwidth used is minimized.

It is obvious to a person skilled in the art that, as the technology advances, the inventive concept can be implemented in various ways. The invention and its embodiments are thus not limited to the examples described above but they may be modified within the scope of the claims.

What is claimed is:

1. A method of controlling a conference call in a system which comprises a conference bridge for combining several audio signals arriving from terminals and transmitting the combined signal further to at least one of said terminals using at least one transmitting codec, the conference bridge comprising a spatialization unit for creating a spatial effect, the method comprising
   determining the number of substantially simultaneously active pre-determined audio components, such as speech signals, from the audio signals of said conference bridge inputs,
   selecting, from a group of codecs comprising at least two different codecs, at least one transmitting codec for use on the basis of said number of simultaneously active pre-determined audio components,
   transmitting said combined signal encoded by a low bit rate audio codec to said at least one terminal in response to the fact that there is only one simultaneously active pre-determined audio component; or
   transmitting said combined signal encoded by a high bit rate audio codec to said at least one terminal in response to the fact that there is more than one simultaneously active pre-determined audio component.

2. A method according to claim 1, further comprising
   processing said combined signal in the spatialization unit included in the conference bridge so that a spatial effect can be created of the conference call participants in said at least one terminal by means of said combined signal.

3. A method according to claim 2, further comprising
   performing spatialization of the combined signal in at least two different steps, which are divided between the conference bridge and the receiving terminal.

4. A method according to claim 1, further comprising alternatively
   transmitting said combined signal to said at least one terminal as a single-channel audio signal and spatializing the received single-channel audio signal in said terminals in response to there being only one simultaneously active speech signal; or
   transmitting said combined and spatialized signal to said at least one terminal as a multi-channel audio signal in response to there being more than one simultaneously active speech signal.

5. A method according to claim 4, wherein said single-channel audio signal is generated alternatively by
   combining said active speech signal from the audio signals of the conference bridge inputs and control signals from the other inputs without transcoding in response to the fact that the same receiving codec and transmitting codec and their same mode are used in the conference bridge; or
   combining said active speech signal from the audio signals of the conference bridge inputs and control signals from the other inputs by transcoding said audio signals of the inputs in response to the fact that different receiving and transmitting codecs or their different modes are used in the conference bridge.

6. A method according to claim 1, comprising
   determining the number of simultaneously active predetermined audio components by means of the VAD units included in the conference bridge inputs.

7. A method according to claim 1, comprising
   determining the number of simultaneously active predetermined audio components by means of ACD units which determine the audio content and are included in the conference bridge inputs.

8. A method according to claim 1, comprising
   determining the number of simultaneously active predetermined audio components by means of the meta data or control information included in the received audio signals, the meta data or control information determining the type of the audio components included in the audio signals.

9. A method according to claim 1, comprising
   determining the number of simultaneously active predetermined audio components from the outputs of an audio processing unit included in the conference bridge by means of a mono/stereo estimator.

10. A method according to claim 1, comprising
    using for selecting said at least one transmitting codec the spatialization information used for said conference call participants in the spatialization unit in addition to said number of simultaneously active predetermined audio components.

11. A method according to claim 1, wherein
    said transmitting codec is arranged to encode all audio channels of the stereo/n-channel combined audio signal by the same audio codec.

12. A method according to claim 1, comprising
    selecting said transmitting codec to be used according to the terminal on the basis of the audio codecs supported by each terminal.

13. A method according to claim 1, wherein
    said transmitting codec is one of the following: GSM EFR/FR/HR speech codec, AMR speech codec, Wideband AMR speech codec, G.711, G.722, G722.1, G.723.1, G.728 or a codec according to MPEG1/2/4, such as an AAC codec or CELP+AAC.

14. An apparatus for controlling a conference call (conference bridge) which is arranged to combine several audio signals arriving from terminals and transmit the combined signal further to at least one of said terminals using at least one transmitting codec, the apparatus comprising a spatialization unit for creating a spatial effect, wherein said apparatus is arranged to
    determine the number of substantially simultaneously active predetermined audio components, such as speech signals, from the audio signals of the inputs of said device,
    select, from a group of codecs comprising at least two different codecs, for use at least one transmitting codec on the basis of said number of simultaneously active predetermined audio components,
    transmit said combined signal encoded by a low bit rate audio codec to said at least one terminal in response to the fact that there is only one simultaneously active predetermined audio component; or
    transmit said combined signal encoded by a high bit rate audio codec to said at least one terminal in response to the fact that there is more than one simultaneously active predetermined audio component.

15. An apparatus according to claim 14, wherein
    said combined signal is arranged to be processed in the spatialization unit of the apparatus so that a spatial effect of the conference call participants can be created in said at least one terminal by means of said combined signal.

16. An apparatus according to claim 15, wherein
    spatialization of the combined signal is arranged to be performed in at least two different steps, at least some of which are arranged to be performed in said apparatus and the others in the receiving terminal.

17. An apparatus according to claim 14, wherein alternatively
- said combined signal is arranged to be transmitted to said at least one terminal as a single-channel audio signal and the received single-channel audio signal is spatialized in said terminal in response to the fact that there is only one simultaneously active speech signal; or
- said combined and spatialized signal is arranged to be transmitted to said at least one terminal as a multi-channel audio signal in response to the fact that there is more than one simultaneously active speech signal.

18. An apparatus according to claim 17, wherein said single-channel audio signal is arranged to be alternatively produced such that
- said active speech signal from the audio signals of the conference bridge inputs and the control signals of other inputs are arranged to be combined without transcoding in response to the fact that the conference bridge uses the same receiving and transmitting codec and their same mode; or
- said active speech signal from the audio signals of the conference bridge inputs and the control signals of other inputs are arranged to be combined by transcoding said audio signals of the inputs in response to the fact that the conference bridge uses different receiving and transmitting codecs or their different mode.

19. An apparatus according to claim 14, wherein the number of simultaneously active predetermined audio components is arranged to be determined by means of VAD units included in the conference bridge inputs.

20. An apparatus according to claim 14, wherein the number of simultaneously active predetermined audio components is arranged to be determined by means of ACD units which are included in the conference bridge inputs and determine the audio content.

21. An apparatus according to claim 14, wherein the number of simultaneously active predetermined audio components is arranged to be determined by means of the meta data or control information included in the received audio signals, the meta data or control information determining the type of the audio components included in the audio signals.

22. An apparatus according to claim 14, wherein the number of simultaneously active predetermined audio components is arranged to be determined from the outputs of the audio processing unit included in the conference bridge by means of a mono/stereo estimator.

23. An apparatus according to claim 14, wherein in addition to said number of simultaneously active predetermined audio components, the spatialization information used for said conference call participants in the spatialization unit is arranged to be used in the selection of said at least one transmitting codec.

24. A teleconferencing system which comprises a conference bridge, which is arranged to combine several audio signals arriving from terminal and transmit the combined signal further to at least one of said terminals using at least one transmitting codec, the conference bridge comprising a spatialization unit for creating a spatial effect, in which system the conference bridge is arranged to
- determine the number of substantially simultaneously active audio components, such as speech signals, from the audio signals of the conference bridge inputs,
- select, from a group of codecs comprising at least two different codecs, at least one transmitting codec for use on the basis of said number of simultaneously active predetermined audio components,
- transmit said combined signal encoded by a low bit rate audio codec to said at least one terminal in response to the fact that there is only one simultaneously active predetermined audio component, or
- transmit said combined signal encoded by a high bit rate audio codec to said at least one terminal in response to the fact that there is more than one simultaneously active predetermined audio component.

25. A teleconferencing system according to claim 24, wherein
- the combined signal is arranged to be spatialized so that the terminal can create a spatial effect of the conference call participants, the spatialization being arranged to be performed in at least two different steps, at least some of which are arranged to be performed in said apparatus and the others in the receiving terminal.

26. A teleconferencing system according to claim 24, wherein
- said system also comprises at least one terminal, which is arranged to receive control information from the terminals participating in the conference call and control said conference call together with said conference bridge.

* * * * *